(12) United States Patent
Hall et al.

(10) Patent No.: US 6,357,766 B1
(45) Date of Patent: Mar. 19, 2002

(54) MULTI-AXIS SUSPENSION SYSTEM

(75) Inventors: Kevin Jerome Hall, Charlotte; Tony Earl Dalton, Statesville; Gregory T. Dewald, Mooresville, all of NC (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/431,158

(22) Filed: Nov. 1, 1999

(51) Int. Cl.⁷ .................................................. B60G 17/00
(52) U.S. Cl. ..................... 280/6.15; 280/5.5; 280/5.514; 280/124.128
(58) Field of Search ................................. 280/5.5, 5.515, 280/124.128, 124.125, 124.153, 124.157, 124.16, 6.15, 5.503, 5.514, 6.155

(56) References Cited

U.S. PATENT DOCUMENTS

| | | | |
|---|---|---|---|
| 2,090,141 A | * 8/1937 | Newton | 280/676 |
| 2,890,063 A | 6/1959 | Stover | 280/109 |
| 2,903,256 A | 9/1959 | Weiss | 267/15 |
| 3,080,177 A | 3/1963 | Mather | 280/124 |
| 3,466,058 A | 9/1969 | King | 280/124 |
| 3,565,456 A | 2/1971 | Zoltok | 280/106.5 |
| 4,175,763 A | 11/1979 | Conner, Jr. | 280/104 |
| 4,647,067 A | * 3/1987 | Paquette et al. | 280/676 |
| 4,744,589 A | * 5/1988 | Buma et al. | 280/707 |
| 5,403,031 A | 4/1995 | Gottschalk et al. | 280/704 |
| 5,924,711 A | * 7/1999 | Schote | 280/124.111 |
| 6,012,724 A | * 1/2000 | Pitkanen | 280/6.155 |
| 6,036,201 A | * 3/2000 | Pond et al. | 280/5.514 |
| 6,098,995 A | * 8/2000 | Danis | 280/6.152 |
| 6,126,177 A | * 10/2000 | Steinert | 280/5.5 |
| 6,135,469 A | * 10/2000 | Hulstein et al. | 280/86.5 |
| 6,135,470 A | * 10/2000 | Dudding | 280/124.128 |

FOREIGN PATENT DOCUMENTS

| | | |
|---|---|---|
| EP | 0 512 550 A2 | 11/1992 |
| EP | 0 553 516 A1 | 8/1993 |
| EP | 0 807 543 A2 | 11/1997 |
| EP | 0 997 328 A1 | 5/2000 |

* cited by examiner

*Primary Examiner*—J. J. Swann
*Assistant Examiner*—J. Allen Shriver
(74) *Attorney, Agent, or Firm*—Liniak, Berenato, Longacre & White

(57) ABSTRACT

A multi-axis suspension system for a vehicle includes a wishbone assembly rotatably connected to the frame about a longitudinal axis. An axle housing is connected to the wishbone assembly via a pair of four bar linkages. A pair of extendable hydraulic cylinders forms a supplemental connection between the rigid axle housing and the wishbone assembly. A hydraulic control circuit controls the length of the hydraulic cylinders to selectively control the relative distance between the axle housing and the wishbone assembly.

16 Claims, 6 Drawing Sheets

MULTI-AXIS SUSPENSION SYSTEM

BACKGROUND OF THE INVENTION

1. Field of the Invention

The present invention is related to a vehicle suspension assembly and more particularly to a multi-axis suspension system to independently control the vertical position and rotation of the axle housing relative to the frame.

2. Summary of the Prior Art

Suspension assemblies for vehicles are well known in the art. In conventional independent suspension systems, each side of an axle housing is independently free to move relative to the frame and with respect to the opposite axle shaft/housing. In such systems, a spring and shock absorber or strut assembly is used to allow dampened and biased displacement of the outer portion of the axle housing relative to the frame.

Another example of a vehicle suspension system attempts to account for travel over uneven surfaces. For example, it is known to rotatably connect an axle housing directly to the vehicle frame. In such assemblies, the position of the outer portion of the axle assembly relative to the frame may be controlled by hydraulically extendable cylinders or special linkage assemblies. Such systems, therefore, control the relative rotation of the axle housing directly to the frame. However, because the axle housing is directly attached to the frame, the vertical distance of the axle housing may not be independently controlled.

An object of the present invention is to overcome and improve upon the drawbacks of the prior art suspension assemblies.

SUMMARY OF THE INVENTION

The present invention is directed to a multi-axis suspension assembly for vehicles. The assembly permits a rigid axle to freely rotate relative to the frame. The rigid axle is connected to a wishbone assembly which in turn is rotatably connected to the vehicle frame about a longitudinal axis of the vehicle. The axle housing is independently connected to the wishbone assembly and the relative vertical position of the axle assembly to the wishbone assembly is selectively controlled. A four bar linkage connects the axle housing to the wishbone assembly and defines the kinematic displacement of the axle housing relative thereto. A pair of extendable hydraulic cylinders forms a supplemental connection between the axle housing and the wishbone assembly. A position sensor senses the position of the axle assembly relative to the wishbone assembly. A control circuit controls the hydraulic cylinders in response to the sensed position of the axle housing. The vertical position of the axle housing relative to the wishbone assembly, and consequently relative to the vehicle frame, may be independently controlled apart from the rotation of the axle housing relative to the vehicle frame.

DESCRIPTION OF THE PREFERRED EMBODIMENT

Figure 1:
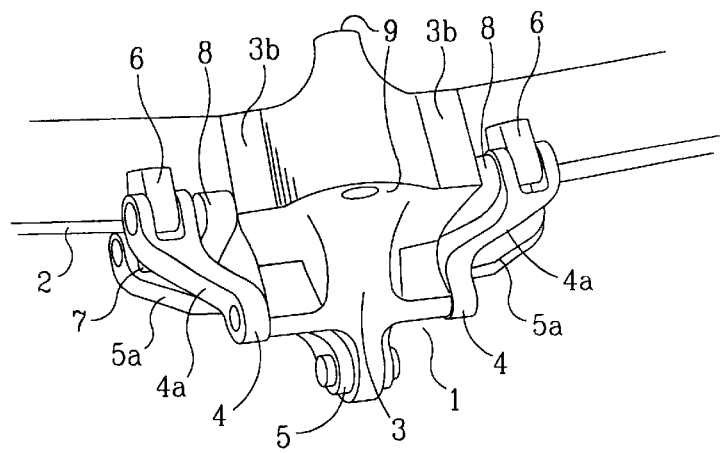
FIG. 1 is a top perspective view of the multi-axis suspension assembly secured to an axle assembly according to the present invention.

The suspension system comprises a wishbone assembly 1 connected to a rigid axle housing 2. The wishbone assembly 1 forms a connection between the rigid axle housing 2 and the vehicle frame 10. The wishbone assembly 1 has a main portion 3, an upper wishbone linkage 4 and a lower linkage 5. The upper wishbone linkage 4 is rotatably secured to the main portion at opposite sides thereof. A pair of upper arms 4a of the upper wishbone linkage 4 is secured to the main portion 3 at opposite sides of the main portion 3. The upper arms 4a are connected by a central piece thereby defining a unitary upper wishbone linkage 4. Similarly, a lower wishbone linkage 5 is rotatably secured to the main portion 3 of the wishbone assembly 1. A pair of lower arms 5a is secured to a lower portion of the main portion 3 of the wishbone assembly 1. Both the upper wishbone linkage 4 and the lower wishbone linkage 5 are rotatably secured to a link 6,7 fixed to the rigid axle housing 2. The upper wishbone linkage 4, lower wishbone linkage 5 and fixed links 6,7 together define a four bar linkage interconnecting the rigid axle housing 2 with the main portion 3 of the wishbone assembly 1. Such an arrangement facilitates adjustable arrangement of the axle housing 2 relative to the main portion of the wishbone assembly. Specifically, the axle housing 2 is selectively vertically adjustable relative to the main portion 3.

Figure 3A:
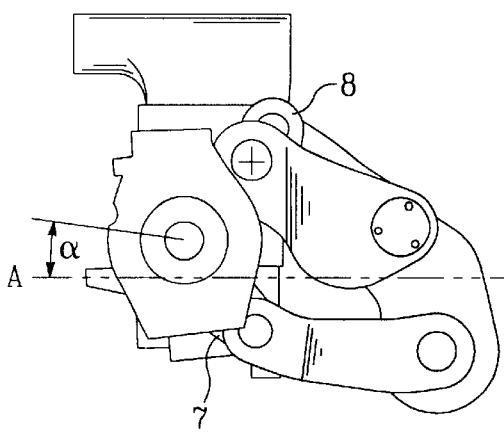
FIGS. 3A & 3B are side views of the multi-axis suspension system in different vertical displacement according to the present invention.
Figure 3B:
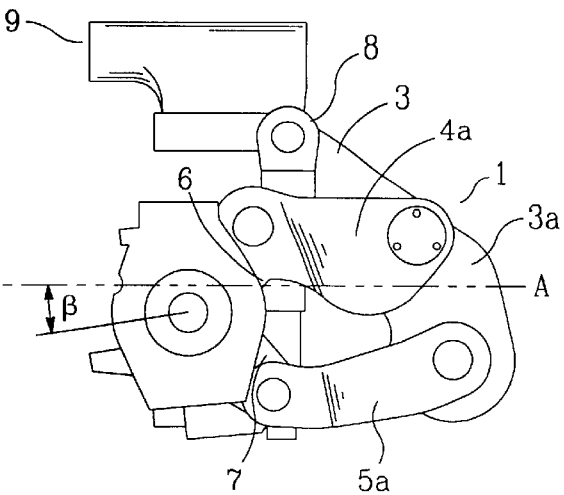

FIGS. 3A & 3B depict different vertical positions of the axle housing 2 relative to the main portion 3. FIG. 3A represents the axle housing 2 in an upper position while FIG. 3B depicts a lower position. The position of the axle housing 2 is controlled by hydraulic actuators 8. The specific construction of the connection of the axle housing 2 and main portion 3 of the wishbone assembly 1 will now be described.

The main 3 portion of the wishbone assembly 1 has a downwardly extending flange 3a. The upper wishbone linkage 4 is rotatably secured to an upper portion of the flange 3a whereas the lower wishbone linkage 5 is rotatably secured to a lower portion of the flange 3a. The specific rotatable connection between the wishbone linkages and the flange will be described later.

A pair of first links 6 are fixed to the axle housing 2 on either side of the wishbone assembly 1 and extend upward toward the upper arms 4a of the upper wishbone linkage 4. Each of the first links 6 is rotatably secured to a corresponding end of the upper arms 4a. Similarly a pair of second links 7 are fixed to the axle housing 2 and extend downward toward the lower arms 5a of the lower wishbone linkage 5. Each of the second links 7 is rotatably secured to a corresponding end of the lower arms 5a of the lower wishbone linkage 5. The first 6 and second 7 links, upper 4a and lower 5a arms define a four bar linkage on either side of the main portion 3 of the wishbone assembly 1. Such an arrangement permits the axle housing 2 to move vertically relative to the wishbone assembly 1.

Ideally, the length of the upper 4a and lower 5a arms and first 6 and second 7 links would be equal and the rotatable connections aligned vertically. Such an arrangement would allow the axle housing 2 to translate vertically without rotation. Sometimes, vehicle configurations pose significant design constraints and such is not always possible. FIG. 3A represents the axle housing in a vertically raise position 50 mm above a neutral position A—A. When raised, the arrangement of this embodiment causes the axle housing to rotate slightly as resented by the angle $\alpha$. In this embodiment the angle of rotation of the axle housing $\alpha$ is insignificant. Similarly, FIG. 3B represents the axle housing 2 in a lowermost position 50 mm below the neutral axis. Angle $\beta$ represents the amount that the axle housing 2 rotates when placed in the lowermost position. In this embodiment the angle of rotation of the axle housing is also insignificant. Consequently, by altering linkage lengths, the pinion shaft angle under total vertical movement, can be custom tailored to suit certain vehicle frame-prop shaft design in a favorable motion to limit Cardan oscillation.

As previously mentioned, a pair of extendable hydraulic cylinders 8 are used to vertically position the axle housing relative to the wishbone assembly 1. A hydraulic cylinder 8 is mounted to a lower portion of the axle housing 2 and secured to the main portion 3 of the wishbone assembly 1. Preferably, the hydraulic cylinders 8 are vertically oriented. A control system is used to control the displacement of the hydraulic cylinders.

Figure 4:
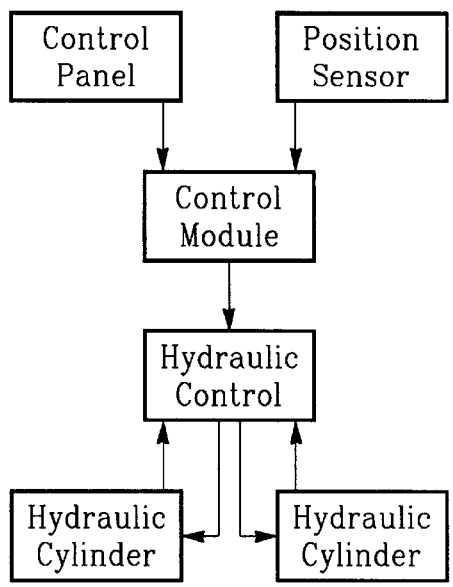
FIG. 4 is a schematic diagram of the control system according to the present invention.

FIG. 4 depicts a schematic diagram of the control system for the hydraulic cylinders 8. A position sensor is mounted proximate the axle housing 2 and wishbone assembly 1 and senses the relative position of the axle housing 2 relative to the wishbone assembly 1. Any type of position sensor may be employed as known in the art. The position sensor sends a signal representative of the relative position of the axle housing 2 to a control module. A control panel also interfaces with the control module. The control panel allows an operator to turn the suspension on, off or lock out all suspension movement.

The control module interfaces with a hydraulic control circuit to control the supply and return of hydraulic oil to and from the hydraulic cylinders 8. Specifically, the pressure and volume of oil is controlled to carry the load. The programmable logic circuit of the control module controls the pumps and valves of the hydraulic circuit to maintain the position of axle housing 2 relative to the wishbone assembly 1 and consequently the frame 10.

Figure 2A:
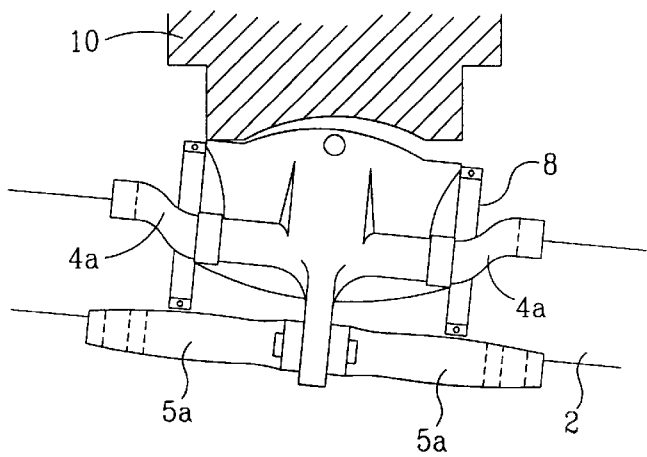
FIGS. 2A & 2B are front views of the multi axis suspension assembly in different degrees of oscillation according to the present invention.
Figure 2B:
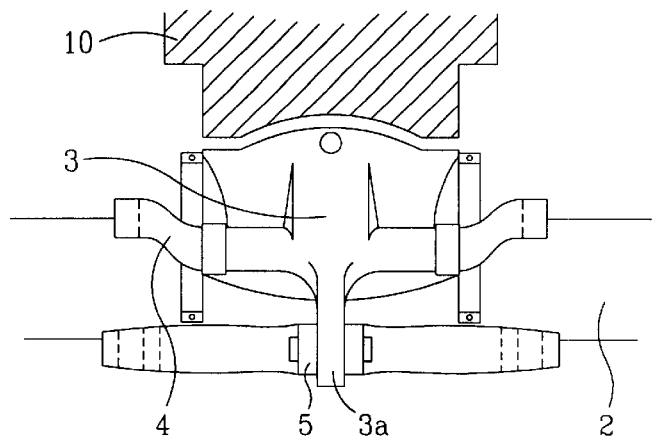

The wishbone assembly 1 is rotatably secured to the frame 10. A longitudinally extending bore 9 is formed along the top of the main portion 2 of the wishbone assembly 1. A bolt, or pin is simply inserted into the longitudinally extending bore 9 and in turn secured to the vehicle frame 10. Such an arrangement allows the wishbone assembly 1, and consequently the axle housing 2 to freely oscillate relative to the frame 10. FIG. 2A represents the wishbone assembly 1 and axle housing 2 oscillated at a 11° relative to horizontal as depicted in FIG. 2B. It is understood that the wishbone assembly 1 and axle housing 2 may oscillate in either direction. The degree of oscillation is preferably limited by the engagement of the frame 10 with the main portion 2 of the wishbone assembly 1 as seen in FIG. 2A. When the wishbone assembly oscillates to the full 11° as seen in FIG. 2A, further oscillation is prevented as a lower channel of the frame 10 engages front stops 3b of the main portion 3 of the wishbone assembly 1. Depending on the degree of freedom, the dimensions of the wishbone assembly 1 can be altered to slightly increase or decrease the amount of oscillation. In other words, the suspension system of the present invention may be employed in existing frame designs that pose design constraints that limit the degree of oscillation. In the embodiment of FIGS. 2A & 2B, the wishbone assembly 1 and axle housing 2 are permitted to oscillate 11° in either direction from horizontal.

It is to be understood that the preferred embodiment of the present invention contemplates free rotation of the wishbone assembly 1 relative to the frame 10. Such an arrangement enhances the ability to maintain the front wheels on the ground when enduring uneven surface conditions. As can be seen in FIG. 1, the present design is contemplated for use in a front wheel steerable suspension assembly. In such an arrangement, the rear suspension does not allow the frame 10 to freely oscillate thereby providing a stable suspension for the frame 10 while allowing the front suspension to oscillate to maintain ground contact.

Figure 5:
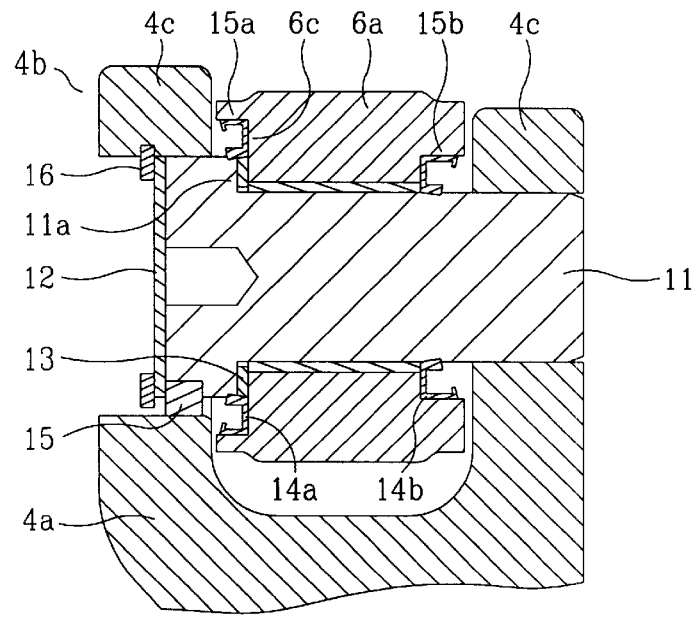
FIG. 5 is a sectional view of the connection between the upper arm and the axle housing link.
Figure 8:
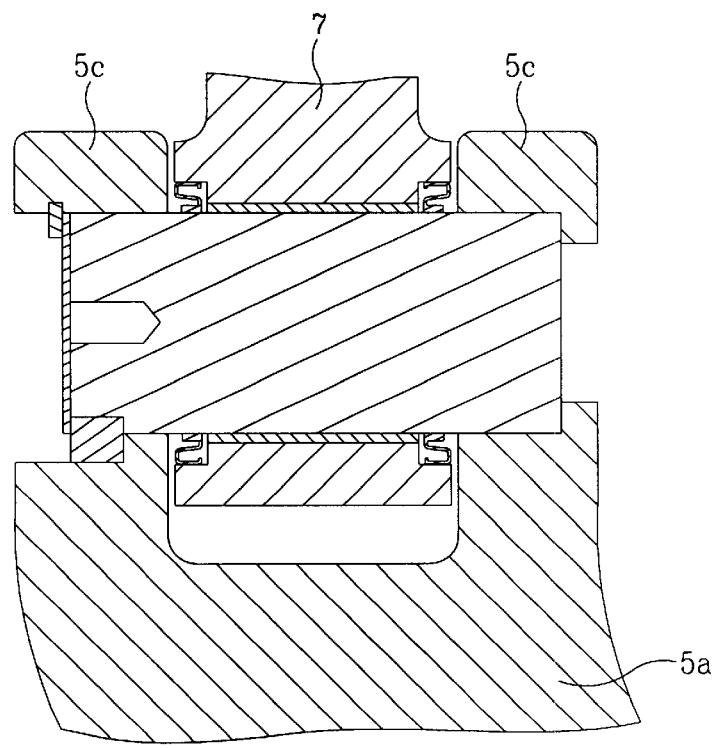
FIG. 8 is a sectional view of the connection between the lower arm and the axle housing link.
Figure 9:
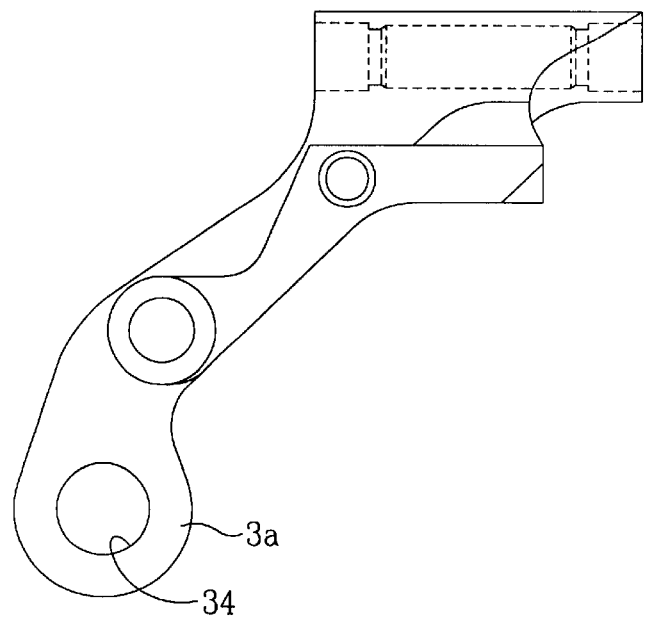
FIG. 9 is a side view of the main portion of the wishbone assembly.
Figure 10:
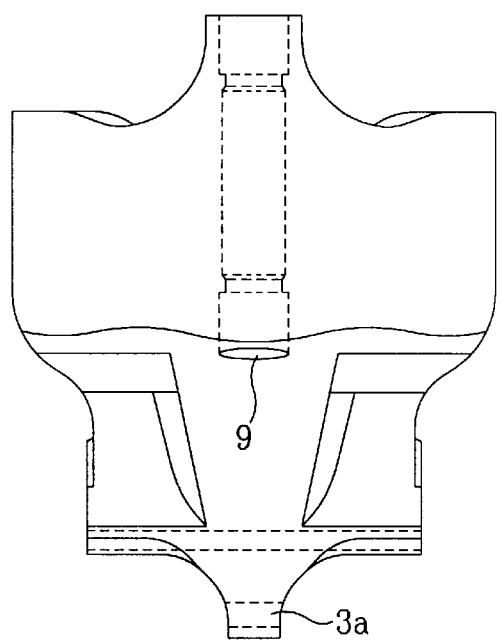
FIG. 10 is a top view of the main portion of the wishbone assembly.
Figure 11:
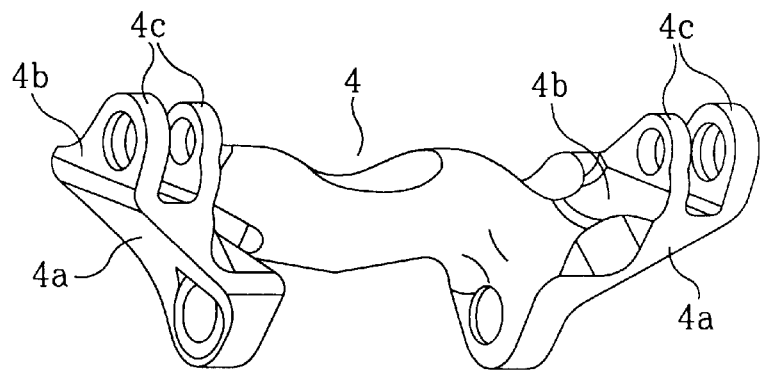
FIG. 11 is a perspective view of the upper wishbone linkage.
Figure 12:
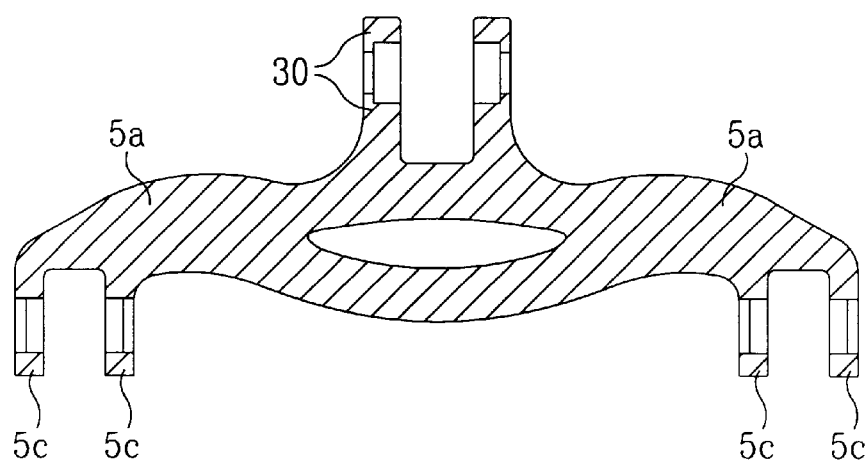
FIG. 12 is a sectional view of the lower wishbone linkage.

The rotatable connections between the upper wishbone linkages 4 to the axle housing links 6 and main portion 3 of the wishbone assembly 1 will now be explained. FIG. 5 represents a rotatable connection between the upper wishbone linkage 4 and the first links 6 fixed to the axle housing 2. This connection may also be employed for the connection between the lower wishbone linkage 5 and the second link 7 fixed to the axle housing 2. However, as will be demonstrated later, that connection is preferably the linkage depicted in FIG. 8. A clevis 4b is formed at the end of each upper arm 4a of the upper wishbone linkage 4. An end 6a of the first link 6 is inserted between opposite ears 4c of the clevis 4b. A bore extends through both ears 4c of the upper arms 4a as well as through the end of the first link 6. A pin 11 is inserted through the bores to form a rotatable connection between the first link 6 and upper arms 4a of the upper wishbone linkage 4. A dry-running steel backed self lubricating bushing 12 is disposed between the first link 6 and the pin 11 to enhance free rotation and provide a bearing surface there between. The inner surface of the bore of the first link 6 has a notch 6c adapted to receive and retain a thrust washer 13. The thrust washer 13 is disposed between a shoulder portion 11a of the pin 11 and the first link 6. The thrust washer 13 prevents the pin 11 from further insertion into the first link 6. The thrust washer 13 is also made of a dry running self lubricating steel backed material to enhance free rotation between the pin 11 and the first link 6. A pair of O-rings 14a,b, or metal-canned rubber lip seals, are disposed in annular grooves 15a,b formed on opposite sides of the bore of the first link 6 to seal the inner bearing surface between the pin 11 and first link 6. A dowel pin 15 is inserted within corresponding notches formed in the outer ear of the clevis and the outer end of the pin 11 to prevent relative rotation between the clevis and pin 11. A retaining ring 16 is disposed within an annular recess formed in the bore of the outer ear of the upper arm 4a. A shim plate or bushing 12 is disposed between the retaining ring 16 and the end of the pin 11 to eliminate transverse movement between the upper linkage 4 and the first link 6. The retaining ring 16 together with the inner shoulder axially retains the pin 11 within the bore of the upper arm 4a and to maintain the overall rotatable connection between the first link 6 and upper arm 4a of the upper wishbone linkage 4. The same type of rotatable connection may be employed for connecting the lower arms 5a of the lower wishbone linkage 5 to the second links 7 fixed to the axle housing 2. However, the preferred connection between the lower arms 5a and the second links 7 fixed to the axle housing is depicted in FIG. 8.

Figure 6:
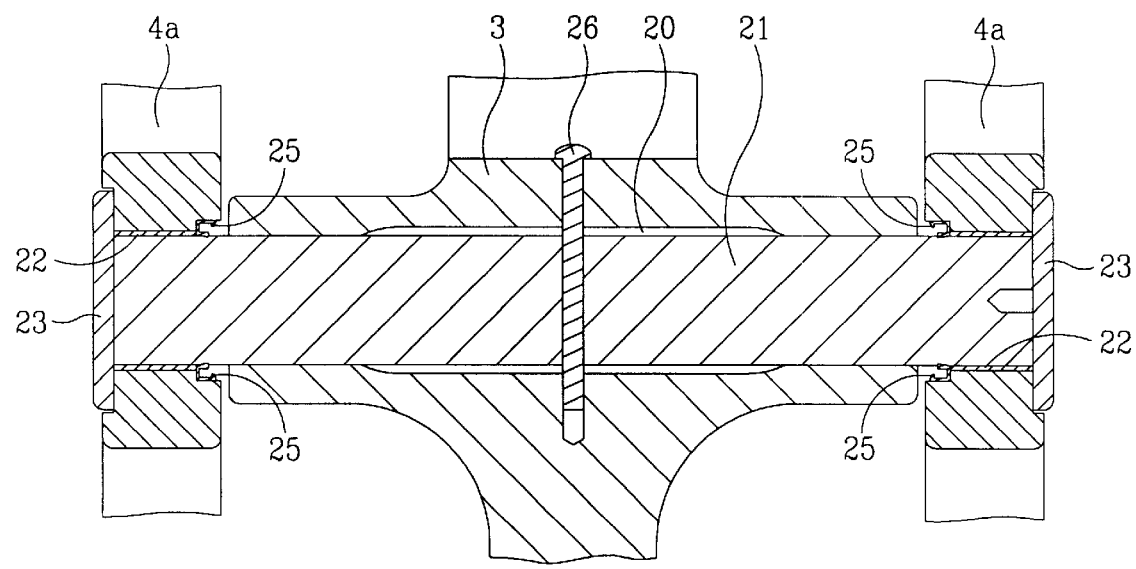
FIG. 6 is a sectional view of the rotatable connection between the upper wishbone link and the main portion of the wishbone assembly.

FIG. 6 represents a rotatable connection between upper wishbone linkage 4 and the main portion 3 of the wishbone assembly 1. The upper arms 4a of the upper wishbone linkage 4 each have a second bore aligned with opposite sides of a transverse bore 20 extending through the main portion 3 of the wishbone assembly 1. A pin 21 is inserted through a first one of the second bores of the upper arms 4a through the transverse bore of the main portion 3 of the wishbone assembly 1 and into the second bore of the opposite upper arm of the upper wishbone linkage 4. Transverse and rotational movement of the pin 21 in the bore 20 of the main portion 3 of the wishbone assembly is prevented by a cross bolt 26 perpendicular to the pin 21, extending through the bore 20 and pin 21. A bushing 22 made of a dry running steel backed material is disposed between the second bores of the upper arm 4a and the pin 21 to provide a lubricating and bearing surface there between. A retaining plate 23 is then bolted to the outer surface of each of the upper arms 4a to retain the pin 21 there between. Because the upper arms 4a are interconnected by a central portion and disposed on either side of the transverse bore, a secure rotatable connection is formed between the upper wishbone linkage 4 and the main portion 3 of the wishbone assembly 1. A lip seal 25 is disposed in annular grooves formed in opposite sides of the second bore of the upper arms 4a to seal the inner bearing surface between the pin 21 and the upper arm 4a. A pair of O-rings/seals not shown are disposed in annular grooves formed in opposite sides of the second bore of the upper arms 4a to seal the inner bearing surface between plate 23 and the upper arms 4a.

Figure 7:
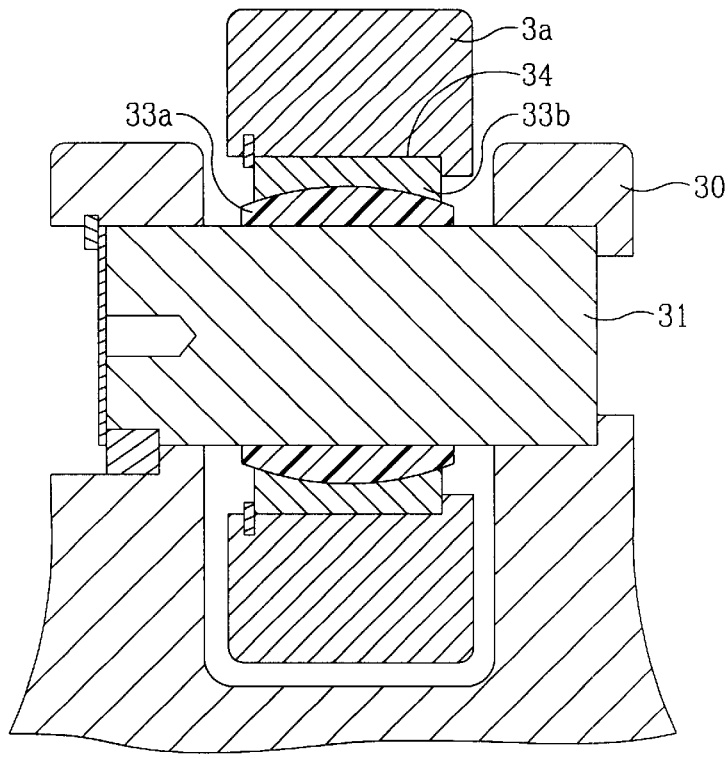
FIG. 7 is an exposed view of the spherical bearing connection between the lower wishbone linkage and the lower portion of the wishbone assembly.

FIG. 7 depicts the spherical connection between the lower wishbone linkage 5 and the main portion 3 of the wishbone assembly 1. This connection is similar to the connection between the first 6 and second 7 links and the upper 4 and lower 5 wishbone linkages. However, the inner and outer bearing races formed within the main portion 3 of the wishbone assembly 1 are substantially semispherical. The lower support arm 5a has a clevis 30 formed at an end adjacent the main portion 3 of the wishbone assembly 1. A pin 31 extends through the clevis 30 and through a bore formed in the main portion 3 of the wishbone assembly 1. An inner semispherical bearing surface or bushing 33a is disposed between the pin 31 and an outer semispherical race 33b which is in turn disposed within the inner surface 34 of the bore extending through the main portion 3 of the wishbone assembly 1. Such an arrangement provides a rotatable and partially pivotal connection between the lower wishbone linkage 5 and the main portion 3 of the wishbone assembly 1. That is the lower wishbone linkage 5 is allowed to pivot to some degree about an axis parallel to the longitudinal axis of the frame 10 while simultaneously permitting the rotatable connection about an axis parallel to the transverse axis. Such an arrangement provides the ability to assemble the entire suspension system and account for manufacturing intolerances.

The axle housing 2 is connected to the wishbone assembly 1 in the following manner. The upper wishbone linkage 4 and lower wishbone linkage 5 are first connected to the corresponding first 6 and second 7 links secured to the axle housing 2 in either order. The upper wishbone linkage 4 is then connected to the main portion 3 of the wishbone assembly 1. Because the lower wishbone linkage 5 has not been connected, the upper wishbone linkage 4 may be easily aligned with the corresponding bore of the main portion 3 of the wishbone assembly 1. Lastly the lower wishbone linkage 5 is connected to the main portion 3. Because of manufacturing intolerances and other design constraints, it may be difficult to properly align the opposite sides of the clevis 30 of the lower wishbone linkage 5 about the corresponding bore in the main portion 3 sufficient to allow proper insertion of the pin 31. However, because this connection comprises a semi-spherical bearing 33, exact alignment is not necessary. The lower wishbone linkage 5 and or pin 31 may be pivoted slightly, as permitted by the spherical bearing surface 33, to allow sufficient alignment to pass the pin 31 into the opposite side of the clevis 30. Such a bearing surface 33 greatly increases the ease of which the present suspension system is assembled. It is noted that present invention is not limited to the exact structure of the spherical bearing and the retainment structure depicted in FIG. 7. Other types of spherical bearing arrangement and rotatable connection to allow the proper alignment of the members is also contemplated as within the spirit and scope of the present invention.

FIG. 8 represents a rotatable connection between the lower wishbone linkage 5 and the second links 7 fixed to the axle housing 2. A clevis is formed at the end of each upper arm 5a of the lower wishbone linkage 5. An end of the second link 7 is inserted between opposite ears 5c of the clevis. A bore extends through both ears 5c of the lower arms 5a as well as through the end of the second link 7. A pin is inserted through the bores to form a rotatable connection between the second link 7 and lower arms 5a of the lower wishbone linkage 5. A dry-running steel backed self lubricating bushing is disposed between the second link 7 and the pin to enhance free rotation and provide a bearing surface there between. A pair of seals are disposed in annular grooves on opposite sides of the bore of the second link 7 to seal the inner bearing surface between the pin and second link 7. A dowel pin is inserted within corresponding notches formed in the outer ear of the clevis and the outer end of the pin to prevent relative rotation between the clevis and pin. A retaining ring is disposed within an annular recess formed in the bore of the outer ear of the lower arm 5a. A shim plate is disposed between the retaining ring and the end of the pin to eliminate transverse movement between the lower linkage 5 and the second link 7. The retaining ring together with the inner shoulder axially retains the pin within the bore of the lower arm 5a and to maintain the overall rotatable connection between the second link 7 and lower arm 5a of the lower wishbone linkage 5.

While the foregoing invention has been shown and described with reference to a preferred embodiment, it will be understood by those possessing skill in the art that various changes and modifications may be made without departing from the spirit and scope of the invention.

For example, while the preferred embodiment utilizes a freely rotatably wishbone assembly relative to the frame, the present invention also contemplates the use of torsion bars or other mechanical devices to place a linear or non-linear biasing force to the wishbone assembly to bias the wishbone assembly in substantial horizontal alignment with the frame.

What is claimed is:

1. A vehicle suspension comprising:
   a frame;

a wishbone assembly rotatably mounted to said frame about a longitudinal axis;

an axle housing adjustably mounted to said wishbone by a linkage assembly and adapted to be selectively positioned relative to said wishbone assembly, wherein said vehicle suspension assembly further comprises at least one extendable hydraulic cylinder connected to said axle housing and said wishbone assembly, said at least one hydraulic cylinder being selectively extendable to control a relative distance between said axle housing and said wishbone assembly and maintain a fixed position of said axle housing relative to said wishbone assembly until said fixed position is desired to be changed.

2. The vehicle suspension assembly according to claim 1, wherein said assembly further comprises a position sensor for sensing a vertical position of said axle housing and a control circuit to control a length of said hydraulic cylinders in response to a position signal generated by said position sensor.

3. A vehicle suspension assembly comprising:

a frame;

a wishbone assembly rotatably mounted to said frame about a longitudinal axis;

an axle housing adjustably mounted to said wishbone by a linkage assembly and adapted to be selectively positioned relative to said wishbone assembly; said linkage assembly including;

an upper wishbone linkage rotatably mounted to an upper portion of said wishbone assembly, said upper wishbone linkage having a pair of upper arms;

a lower wishbone linkage rotatably mounted to a lower portion of said wishbone assembly, said lower wishbone linkage having a pair of lower arms, a pair of first links fixed to said axle housing and rotatably mounted one each to said upper arms; and a pair of second links fixed to said axle housing and rotatably mounted one each to said lower arms, said upper wishbone linkage, said lower wishbone linkage and said first and second pair of links together defining a pair of four bar linkages.

4. The vehicle suspension assembly according to claim 3, wherein said assembly further comprises:

at least one extendable hydraulic cylinder connected to said axle housing and said wishbone assembly, said hydraulic cylinder being selectively extendable to control a substantially vertical distance between said axle housing and said wishbone assembly.

5. The vehicle suspension assembly according to claim 3, wherein a first rotatable connection between said upper wishbone linkage and said wishbone assembly comprises:

a pin extending through a main portion of said wishbone assembly along a transverse direction orthogonal to said longitudinal axis and extending beyond said main portion in opposite directions on opposite sides of said main portion, each of said upper arms having a bore disposed about opposite ends of said pin proximate said sides of said main portion of said wishbone assembly, each of said bores having a bushing disposed between said bore and said pin, and a pair of retaining plates one each secured to an outer side of said pair of upper arms to retain said upper arms and said upper wishbone linkage to said main portion of said wishbone assembly.

6. The vehicle suspension assembly according to claim 5, further comprising:

a thrust washer disposed between said each of said retaining plates and said pin, said thrust washers and said bushings being formed of a self lubricating steel backed material, said assembly further comprising a seal disposed between said bore and said pin of each of said upper arms.

7. The vehicle suspension assembly according to claim 3, wherein a second rotatable connection between said upper arms and said pair of first links comprises:

a clevis formed on an end of each of said pair of upper arms opposite said first connection, a bore extending through an end of each of said first links opposite an end adjacent said axle housing, said ends and said bore of said first links being disposed one each within one of said clevis of said upper arms;

a pin extending through each of said clevis and said bore of said first link thereby forming said second connection.

8. The vehicle suspension assembly according to claim 7, wherein said second rotatable connection further comprises:

a bushing made of a self-lubricating steel backed material disposed between said pin and said bore of said first link enhancing a relative rotation between said first link and said pin, wherein said pin engages a shoulder formed on an inner side of said clevis to prevent said pin from passing there through;

a dowel pin engaging an outer side of said clevis and an outer portion of said pin to prevent relative rotation between said pin and said clevis of said upper arm; and a retaining ring secured to said outer side of said clevis and engaging said pin, said shoulder formed on said inner side of said clevis together with said retaining ring maintaining said pin within said clevis.

9. The vehicle suspension assembly according to claim 3, wherein a third rotatable connection between said lower wishbone linkage and lower portion of said wishbone assembly comprises:

a spherical bearing formed in said lower portion of said wishbone assembly;

a clevis formed on an end of said lower wishbone linkage and having ears disposed on opposite sides of said bearing of said lower portion of said wishbone assembly; and a pin extending through said bore of said ears and said spherical bearing thereby establishing a compound rotatable and pivotal connection between said lower wishbone linkage and lower portion of said wishbone assembly.

10. A vehicle suspension assembly comprising:

a frame;

a wishbone assembly rotatably connected to a central portion of said frame, said wishbone assembly being rotatable about a longitudinal axis of said frame;

an axle housing secured to said wishbone assembly and being substantially vertically positionable relative to said wishbone assembly independent from a relative position between said wishbone assembly and said frame; and at least one substantially vertical selectively extendable member connecting said axle housing and said wishbone assembly to selectively position a vertical position of said axle housing relative to said wishbone assembly, wherein rotation of said wishbone assembly relative to said frame and vertical displacement of said axle housing relative to said wishbone assembly produces a compound movement of said axle housing relative to said frame.

11. The vehicle suspension assembly according to claim 10, wherein said assembly further comprises at least one extendable hydraulic cylinder connected to said axle housing and said wishbone assembly, said at least one hydraulic cylinder being selectively extendable to control a relative distance between said axle housing and said wishbone assembly.

12. The vehicle suspension assembly according to claim 11, wherein said assembly further comprises a position sensor for sensing a vertical position of said axle housing and a control circuit to control a length of said hydraulic cylinders in response to a position signal generated by said position sensor.

13. The vehicle suspension assembly according to claim 10, wherein said linkage assembly comprises:

an upper wishbone linkage defined by a pair of upper arms, said upper arms being rotatably mounted to said wishbone assembly;

a lower wishbone linkage rotatably mounted to a lower portion of said wishbone assembly, said lower wishbone assembly having a pair of lower arms, a pair of first links fixed to said axle housing and rotatably mounted one each to said upper arms;

a pair of second links fixed to said axle housing and rotatably mounted one each to said lower arms, said upper wishbone linkage, said lower wishbone linkage and said first and second pair of links defining a four bar linkage.

14. A vehicle suspension assembly comprising:

a frame;

a wishbone assembly pivotally mounted to said frame about a longitudinal axis of said frame, said wishbone assembly having a main portion and a lower wishbone linkage rotatably mounted to a lower portion of said main portion about a transverse axis orthogonal to said longitudinal axis, said lower linkage having a pair of lower arms each extending outwardly parallel to said transverse axis and in a common direction parallel to said longitudinal axis and terminating at opposite lower connection points, said wishbone assembly further having a pair of upper arms each rotatably secured to an upper portion of said main portion of said wishbone assembly about an axis parallel to said transverse axis, said upper arms each extending outward in opposite directions parallel to said transverse axis and in a common direction parallel to said longitudinal axis and terminating at opposite upper connection points, said upper arms defining an upper wishbone linkage;

an axle housing having;

a pair of upper links each rigidly secured to said rigid axle housing and pivotally connected to a corresponding one of said opposite upper connection points of said upper arms of said upper wishbone linkage;

a pair of lower links each rigidly secured to a lower portion of said rigid axle housing and pivotally connected to a corresponding one of said opposite lower connection points of said lower arms of said lower wishbone linkage; and a pair of extendable hydraulic cylinders each secured to said axle housing and said main portion of said wishbone assembly, said hydraulic cylinders each being controllably extended to selectively vertically position said axle housing relative to said wishbone assembly.

15. The vehicle suspension according to claim 1, wherein said extendable hydraulic cylinder is selectively controllable in a substantially vertical direction and selectably controls and maintains a vertical position of said axle housing relative to said wishbone assembly.

16. The vehicle suspension according to claim 15, further comprising a control module controlling a supply and return of hydraulic oil of said extendable hydraulic cylinders to selectively control and maintain said position of said axle assembly relative to said wishbone assembly.

* * * * *